United States Patent
Parks et al.

(10) Patent No.: US 8,635,307 B2
(45) Date of Patent: Jan. 21, 2014

(54) SENSOR DISCOVERY AND CONFIGURATION

(75) Inventors: Greg Parks, Redmond, WA (US); Ruston Panabaker, Bellevue, WA (US); Andrew Fuller, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1016 days.

(21) Appl. No.: 11/704,082

(22) Filed: Feb. 8, 2007

(65) Prior Publication Data

US 2008/0196083 A1 Aug. 14, 2008

(51) Int. Cl.
*G06F 15/177* (2006.01)
(52) U.S. Cl.
USPC ............ 709/220; 709/218; 707/602; 707/688
(58) Field of Classification Search
USPC ......................... 709/218, 220; 707/602, 688
See application file for complete search history.

(56) References Cited

U.S. PATENT DOCUMENTS

| | | | |
|---|---|---|---|
| 5,920,477 A | 7/1999 | Hoffberg et al. | |
| 5,974,262 A | 10/1999 | Fuller et al. | |
| 6,262,730 B1 | 7/2001 | Horvitz et al. | |
| 7,165,122 B1* | 1/2007 | Sitaraman et al. | 709/250 |
| 8,468,595 B1* | 6/2013 | Huang et al. | 726/22 |
| 8,472,418 B2* | 6/2013 | Shaffer et al. | 370/338 |
| 2002/0032733 A1 | 3/2002 | Howard | |
| 2004/0030705 A1 | 2/2004 | Bowman-Amuah | |
| 2004/0243840 A1* | 12/2004 | Tran | 713/201 |
| 2005/0267960 A1* | 12/2005 | Jung et al. | 709/223 |
| 2006/0033701 A1 | 2/2006 | Wilson | |
| 2006/0114531 A1* | 6/2006 | Webb et al. | 359/15 |
| 2006/0179450 A1 | 8/2006 | Trappeniers et al. | |
| 2006/0240853 A1* | 10/2006 | Donner et al. | 455/466 |
| 2007/0067360 A1* | 3/2007 | Engel et al. | 707/204 |
| 2007/0210929 A1* | 9/2007 | Sabata et al. | 340/686.5 |
| 2007/0279214 A1* | 12/2007 | Buehler | 340/521 |
| 2008/0005780 A1* | 1/2008 | Singleton | 726/1 |
| 2008/0052395 A1* | 2/2008 | Wright et al. | 709/224 |
| 2008/0119130 A1* | 5/2008 | Sinha | 455/1 |
| 2008/0172366 A1* | 7/2008 | Hannel et al. | 707/3 |
| 2008/0235387 A1* | 9/2008 | Chess et al. | 709/230 |
| 2009/0178111 A1* | 7/2009 | Moriconi et al. | 726/1 |
| 2009/0313680 A1* | 12/2009 | Hirano | 726/3 |
| 2010/0306179 A1* | 12/2010 | Lim | 707/688 |

FOREIGN PATENT DOCUMENTS

WO WO2006001631 A1 1/2006
WO WO2006011701 A1 2/2006

OTHER PUBLICATIONS

Dalton, et al., "Sensing User Intention and Context for Energy Management", http://www.cs.duke.edu/ari/millywatt/faceoff.pdf.

(Continued)

*Primary Examiner* — Oleg Survillo
(74) *Attorney, Agent, or Firm* — L. Alan Collins; Collins & Collins Intellectual, LLC

(57) ABSTRACT

A system for policy-based applications may be developed by using non-device specific policies that are executed on a policy engine. During installation, available sensor devices are identified by metadata that describes the devices within a taxonomy of sensor devices, and a separate device policy may be installed and executed by each sensor device. The policy engine, in conjunction with the sensor devices operating a device policy, may be execute a wide range of applications. In many applications, a sensor device may detect that a first policy engine is not available and send communications to a second policy engine that may be accessed through the Internet.

17 Claims, 4 Drawing Sheets

(56) References Cited

OTHER PUBLICATIONS

Rosenstein, et al., "User Intentions Funneled Through a HumanRobot Interface", http://www-symbiotic.cs.ou.edu/papers/2004/Rosenstein_IUI05.pdf.

Vanhooydonck, et al., "Shared Control for Intelligent Wheelchairs: an Implicit Estimation of the User Intention", Date: Mar. 13-15, 2003, http://www.mech.kuleuven.be/mlr/publications/ASER2003_Dirk.pdf.

Wilson, Andy, "XWand: UI for Intelligent Environments", http://research.microsoft.com/~awilson/wand/default.htm.

* cited by examiner

SENSOR DISCOVERY AND CONFIGURATION

BACKGROUND

Input devices or other sensors are used to sense and control real world situations by computer devices. Sensors may range from simple devices such as a switch to complex devices that have video input and logic processors. As computers, networking, and communication devices become more pervasive, applications that take advantage of various sensors can do more and more complex tasks.

The interface between a sensor and a processor that analyzes and handles the sensor input can become very complex. As the complexity rises, the interface can become unwieldy for an average user or even a trained technician to install.

SUMMARY

A system for policy-based applications may be developed by using non-device specific policies that are executed on a policy engine. During installation, available sensor devices are identified by metadata that describes the devices within a taxonomy of sensor devices, and a separate device policy may be installed and executed by each sensor device. The policy engine, in conjunction with the sensor devices operating a device policy, may execute a wide range of applications. In many applications, a sensor device may detect that a first policy engine is not available and send communications to a second policy engine that may be accessed through the Internet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
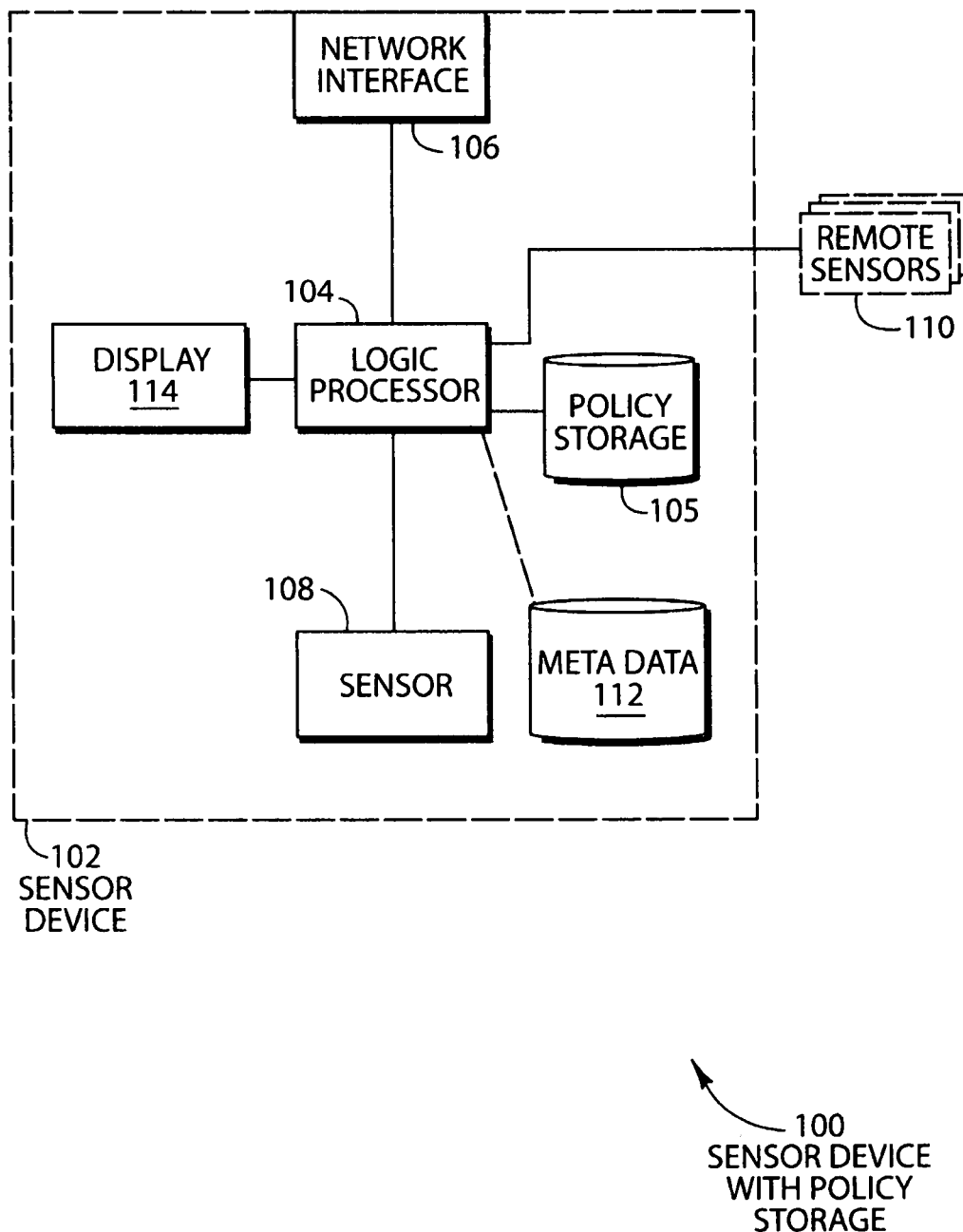
FIG. 1 is a diagram of an embodiment showing a sensor device with policy storage.

A system for connecting various sensor devices to other devices has a policy engine that uses the output of the sensor devices. A policy generator may be used to create policies for a local policy engine as well as a policy engine that is accessed over a network such as the Internet. Each sensor device may have a sensor policy that enables the sensor device to communicate with a local policy engine and a remote policy engine.

The device policies may include rules and conditions for when data is transmitted and to which policy engine the data is sent. In many cases, a sensor device may determine that one of the policy engines is not available and then transmit data to the other policy engine.

The system may be useful for connecting various disparate devices together in different applications. One example is home automation, where different network devices, from doorbells and intrusion sensors to video monitoring sensors may be connected to other devices such as light fixtures, cellular telephones and computer monitors in a myriad of ways.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a sensor device with policy storage. A sensor device 102 has a logic processor 104 that is connected to a network interface 106, a policy storage 105, and a sensor 108.

The sensor device 102 is a device that may be loaded with a set of policies that define various actions that the device 102 may take based on conditions of the sensor 108. The policies may be actions such as transmitting a predetermined message to a policy engine when an input condition is met. The actions may also involve determining if a first policy engine is available and transmitting a message to a second policy engine if the first one is not available.

The policies executed by the sensor device 102 may involve intricate calculations, a myriad of sensor inputs, and complex rules and logic. The results of the policies may include controlling a display 114 or other output device and may also include sending communications to a policy engine. The communications or messages may include predetermined transmissions or may include variable data that is generated from any output from the sensor 108. In some embodiments, such messages may be separate, individual messages transmitted when a condition is met, while in other embodiments, communications may be in a streaming format.

In some embodiments, the policies may include details for communicating with a policy engine. For example, a policy may include addresses for policy engines, various parameters used by the policy engine to authenticate incoming transmissions, specific formats for communications, or other parameters. Various policies may also include parameters for constructing queries to determine if a policy engine is available and mechanisms for discerning various status parameters concerning a policy engine.

Some embodiments may include policies that respond to queries received on the network interface 106. For example, a policy engine may send a query to the sensor device 102 to which the sensor device 102 may respond using a policy within the sensor device 102.

The sensor device 102 may have metadata 112 that may be transmitted to a policy engine. In some embodiments, a policy engine may detect that the sensor device 102 is present and perform a query to determine the metadata 112 concerning the sensor device 102.

The metadata 112 may include a classification defining a type of sensor device as well as parameters describing protocols and mechanisms for communicating with the sensor device 102, information regarding the available sensory output, details used for interpreting sensory output, metadata used for storing, modifying, and retrieving policy data, and other metadata that may be used by a policy engine to interface with the sensor device 102.

The sensor 108 may be any type of input device. An example may include a doorbell, water level sensor, or other sensor that comprises a simple binary output. Other examples may include a video camera with a video processor able to detect motion or other conditions based on a video signal. Some sensors 108 may have several components, including audio, video, binary, numerical, text, analog, and digital data. In some embodiments, a processor may analyze data from the various sensors and create a summarized version of the data to be transmitted across the network interface 106. In other embodiments, the data may be transformed, adjusted, or modified before transmission. In still other embodiments, the data may be transmitted in a raw or unchanged state.

The sensor 102 may include a display 114 or other output device. In some embodiments, the display 114 may operate using polices applied by the logic processor 104, or the display 114 may be controlled by a remote policy engine. In some embodiments, a sensor 102 may not include the display 114. The display 114 may be an output device, such as a light, video monitor, audio speaker, but may also be an actuator that performs a mechanical movement such as shutting a door, changing fan speed, starting a process on another device, or any other output function.

In an example of a doorbell sensor, the display 114 may be a light within a doorbell switch actuated by a visitor to a house. When the visitor presses the doorbell switch, the light may be turned off using a policy within the doorbell sensor itself. If a door is remotely unlocked, a signal may be transmitted to the doorbell sensor to illuminate the light in a green color to indicate to the visitor to proceed through the door. In such an example, the display 114 may be controlled by a local logic processor in one case but may also be controlled by a remote policy engine.

In the example, the doorbell sensor may act as a part of a larger application. The doorbell sensor may collect a specific set of data, such as when a visitor presses a doorbell button, and transmit the data to a policy engine. The policy engine connected to a network may turn on a video camera mounted near the door as well as an audio interface. The policy engine may transmit an image from the video camera and an audio signal from the audio interface and display them on a user's computer screen. The user may communicate with the visitor and indicate through the user's computer that the visitor may be let in. The policy engine may then actuate a remote door lock to unlock the door and indicate that the door is open through a light on the doorbell.

The example illustrates a complex application that may use multiple sensors and multiple output devices to perform the application. In the example, sensor devices included the doorbell, the video camera, the audio interface, the input device on the person's computer, and any audio input from the person's computer. Each of the sensor devices may comprise separate device policies that enable the devices to communicate with a policy engine that may coordinate the various sensor devices and output devices into a useful application.

Because the sensor devices may be classified into various types and configurations, an application may be constructed using generic rules that accept generalized input from devices to perform specific functions. The application may be constructed beforehand using the generic rules and, when installed, the application may use the specific available sensor devices for the application that happen to be available.

Using the doorbell example above, the application may be constructed to use a binary input device as a signal to turn on various devices such as a video and audio feed. During installation, any sensor device that has a binary output may be configured for the binary input. Using metadata for each sensor, those sensors capable of providing a binary output may be offered to a user for selection. In many cases, a sensor device may have several different available outputs that may be configured. For example, a video camera with a video processor may be able to detect motion in a video image and produce a binary output when motion is sensed. Since the application may use any binary input, a user may have an option of selecting the doorbell's binary output or the camera's binary output for the purposes of initiating the doorbell sequence. In the case of the doorbell, a binary output may be a simple on/off function. In the case of the camera, a binary output may be the result of an analysis of a digital representation.

A sensor device may have metadata that identifies a classification for the device. The classification may be arranged in a taxonomy of devices, and may be organized in any useful manner. In many such taxonomies, a device may be listed in two or more different classifications. Some devices may have several different types of classifications based on how the device could be configured, and such devices may include metadata that enables a policy engine or other system to configure the device into a particular classification.

When a device is selected to operate in a particular mode for an application, a device policy may be generated and transferred to the sensor device. The sensor device may then execute the device policy as part of a larger application. In some embodiments, a sensor device may execute device policies as part of several different applications operating on several different policy engines.

In some embodiments, a centralized logic processor 104 may have one or more remote sensors 110 that are connected to the logic processor 104. The centralized logic processor 104 may connect to several remote sensors 110 and present the individual sensors as separate devices to a policy engine. In such an embodiment, each remote sensor 110 may act as if it were a standalone sensor device with a separate policy applied to each of the many remote sensors 110. In other embodiments, the centralized logic processor 104 may coordinate many remote sensors 110 and present a single sensor device 102 to a policy engine. In such an embodiment, the sensor device 102 may have several sensors to which a sensor policy may apply rules across multiple sensors. In some cases, multiple output devices or displays 114 may be connected to the logic processor 104.

The logic processor 104 may be any type of state machine, gate array, general purpose microprocessor, or other device capable of implementing a device policy and communicating on a network.

The network interface 106 may be any type of communications interface that may enable one device to communicate with another. In many instances, the network may be a general purpose network shared by many different types of devices. An example may be a wireless network such as an IEEE 802.11 network, Bluetooth, or a hardwired network such as an Ethernet network operating TCP/IP or Universal Serial Bus. In other instances, the network may be a dedicated communications channel between two devices such as a hardwired direct serial or parallel connection between a device and a policy engine.

The policy storage 105 may be any type of memory adapted to store policies that may be received through the network interface 106. The policy storage 105 may be a non-volatile or volatile memory in any suitable configuration.

Figure 2:
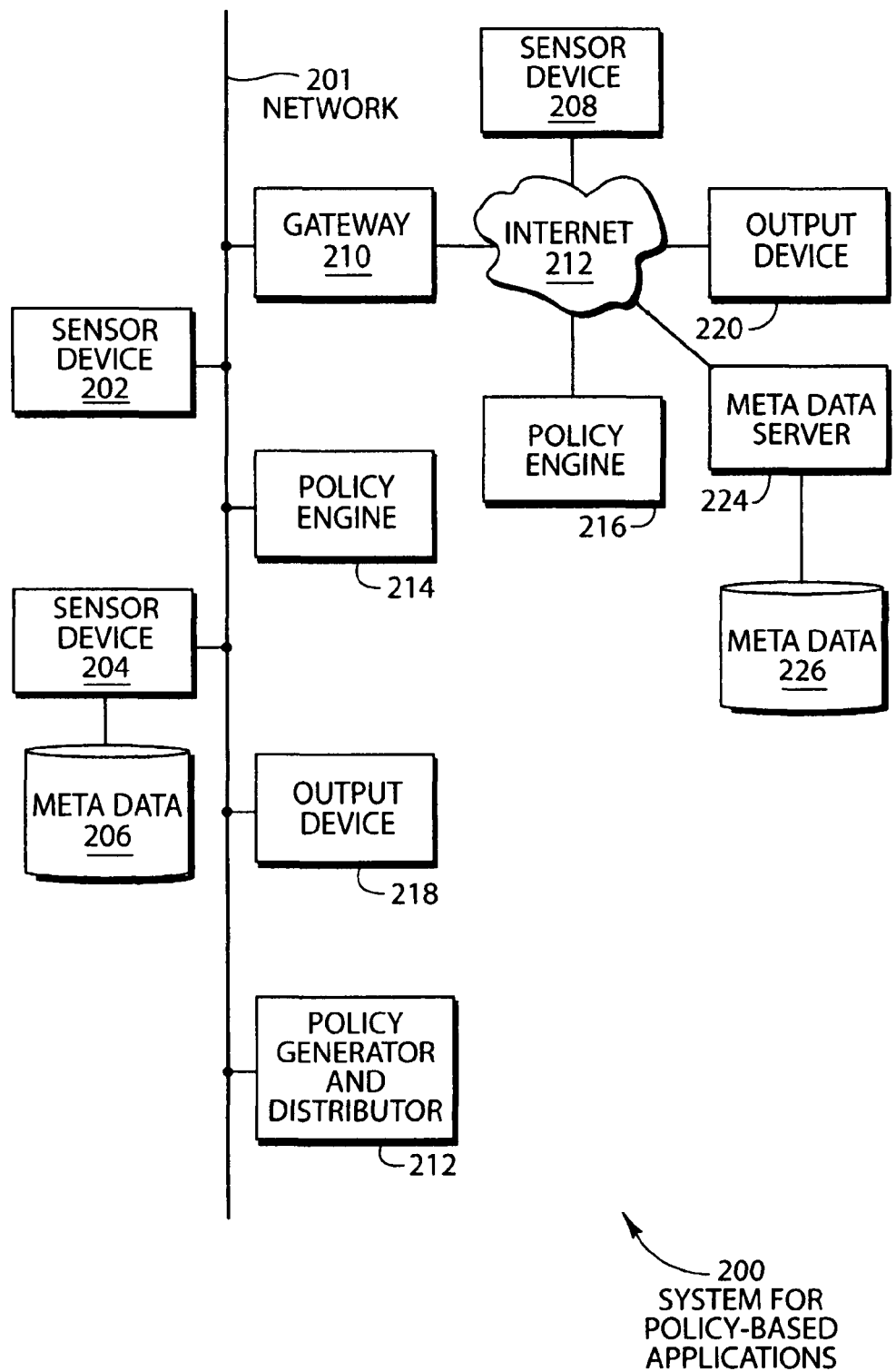
FIG. 2 is a diagram of an embodiment showing a system for policy-based applications.

FIG. 2 is a diagram illustration of an embodiment 200 showing a system for policy-based applications. A network 201 is connected to sensor devices 202 and 204. Sensor device 204 has a metadata storage 206. A sensor 208 is connected to the network 201 through the gateway 210 and the Internet 212.

A policy generator 212 and a policy engine 214 are also connected to the network 201. A second policy engine 216 is connected to the network 201 through the gateway 210 and the Internet 212.

Output device 218 is connected to the network 201, and output device 220 is connected to the network 201 through the gateway 210 and the Internet 212.

A metadata server 224 is connected to the Internet 212 and is attached to a metadata storage 226.

The embodiment 200 is a network of connected devices capable of operating policy-based applications. The policy generator 212 may be a device that generates device policies and server policies that are disseminated to the various devices and servers. The policies as a group may coordinate to perform a specific task or application, such as in the example of a doorbell application described above.

Device policies are policies that are executed by a sensor device and may perform a low-level operation for a large scale application. Such low-level operations may include sending a communication based on reaching a predetermined threshold on a sensor or determining a condition exists based on a combination of sensory inputs available to the sensor device. The communication from the various sensors to one of the policy engines 214 or 216 may trigger a specific action to occur, based on the policy of the policy engine.

The policy generator and distributor 212 may perform several tasks associated with configuring a policy-based application. A generic set of policies for an application may be created by defining rules and relationships between devices using generic definitions of devices. Using the application example of a doorbell detailed above, an application may have several rules that use a generic binary input device. A collection of rules, relationships, decision points, thresholds, procedures, sequences, and other elements may make up a set of policies.

The policy generator and distributor 212 may take the generic application policies, create device-specific policies for each implementation, and load the device-specific policies into the various devices. For example, when a sensor device is selected as a binary input device, a device policy may be generated to configure the sensor device with binary output and to send a signal to a specific policy engine. The device policy may include any type of configuration information and may also include logic, analysis, or other processing functions that may be appropriate for the sensor device.

Similarly, the application policies created for the policy engines may include information on which specific devices will be input and output devices, how to communicate with the various devices, and the logic or rules to apply to various conditions.

The policy generator 212 may be a programmable device that may execute a policy that is generated by a user-initiated or user-created input, through selection of existing policies, or through any other mechanism for determining a policy. In some instances, the policy generator 212 may be a logic device with little or no readily changeable internal logic, such as a field programmable gate array, a read only memory device, or a hardwired logic circuit or state machine.

The policy distribution function may involve installing or distributing the various policies to the devices on which the policies may operate. For example, device policies may be delivered to the various sensor devices and application policies may be distributed or installed on the policy engines. In some embodiments, a sensor device may have a policy pushed to it, where the policy distributor sends the policy to the sensor device. In other embodiments, a device policy may be pulled from the policy distributor by the sensor device.

In some embodiments, a single device may incorporate various functions that are described in the embodiment 200 as separate entities. For example, a server device attached to the network 201 may perform the functions of the policy generator and distributor 212 as well as the policy engine 214. In some examples, such a server device may also perform the functions of an output device 218 and even one or more of the sensor devices 202 and 204.

In many applications, a sensor device may be given a policy that includes a process whereby a first policy engine is detected. If detected, the sensor device may send data to the first policy engine. If not detected, data may be sent to a second policy engine, which may be a policy engine 216 located over the Internet 212. Such an application may enable different actions to occur when the first policy engine is not available.

Using the previous example of a doorbell application, the first policy engine may be a user's personal computer in the same home as the doorbell. When the user's personal computer and policy engine are operational, the doorbell application may bring up a window displaying a video feed from a video camera located near the doorway. When the user's personal computer and policy engine are not operational, the doorbell action may prompt a remote policy engine located over the Internet to send a text message to the user's cellular phone, as an example. Thus, a first policy may be tailored for a specific action when a first policy engine is present while a second policy may be adapted for a different action acted upon by a second policy engine. In some instances, one of the policy engines may be defined as a 'default' policy engine.

The policy engine 216 located on the Internet 212 may be used as a primary or secondary policy engine. In some applications, a sensor device may have a policy that uses the policy engine 216 as the primary policy engine and, if policy engine 216 is not available, transmits data to the local policy engine 214. In other applications, the policy engine 216, which is available through the Internet, may be the only policy engine to which a sensor device may transmit.

The policy generator and distributor 212 may also perform functions as a device discoverer. A device discoverer may detect various devices attached to a network or other communications channels and detect which devices are available. The device discoverer may also query each device to determine metadata associated with the device. In some instances, a device discoverer may obtain metadata directly from a device, such as device 204 with attached metadata database 206. In other instances, a device discoverer may obtain metadata through a query of a metadata server 224 that has an attached metadata database 226 that may contain metadata concerning the device. In some cases, a portion of the metadata may be available through a query of the device itself, with additional or updated metadata provided through a metadata server 224.

In some embodiments, a device discoverer may send a broadcast query across the network 201 to discover the various sensor devices, or the various devices may be configured to broadcast a presence message across the network 201 in order to be discovered. In other embodiments, a device attached to the network 201 may keep an updated list of available devices.

The network 201 is shown as a typical local area network. However, any type of network configuration may be possible. In some cases, the connections between the various devices may be spread out over a network, including sensor devices 208, output devices 220, and policy engines 216 that may be accessed through the Internet 212.

In other embodiments, the various sensor devices, output devices, and policy engines may be connected inside a single device. For example, a laptop computer may have an internal sensor device, a display output device, and a general purpose processor that operates as a policy engine as well as a policy generator, distributor, and sensor detector.

Figure 3:
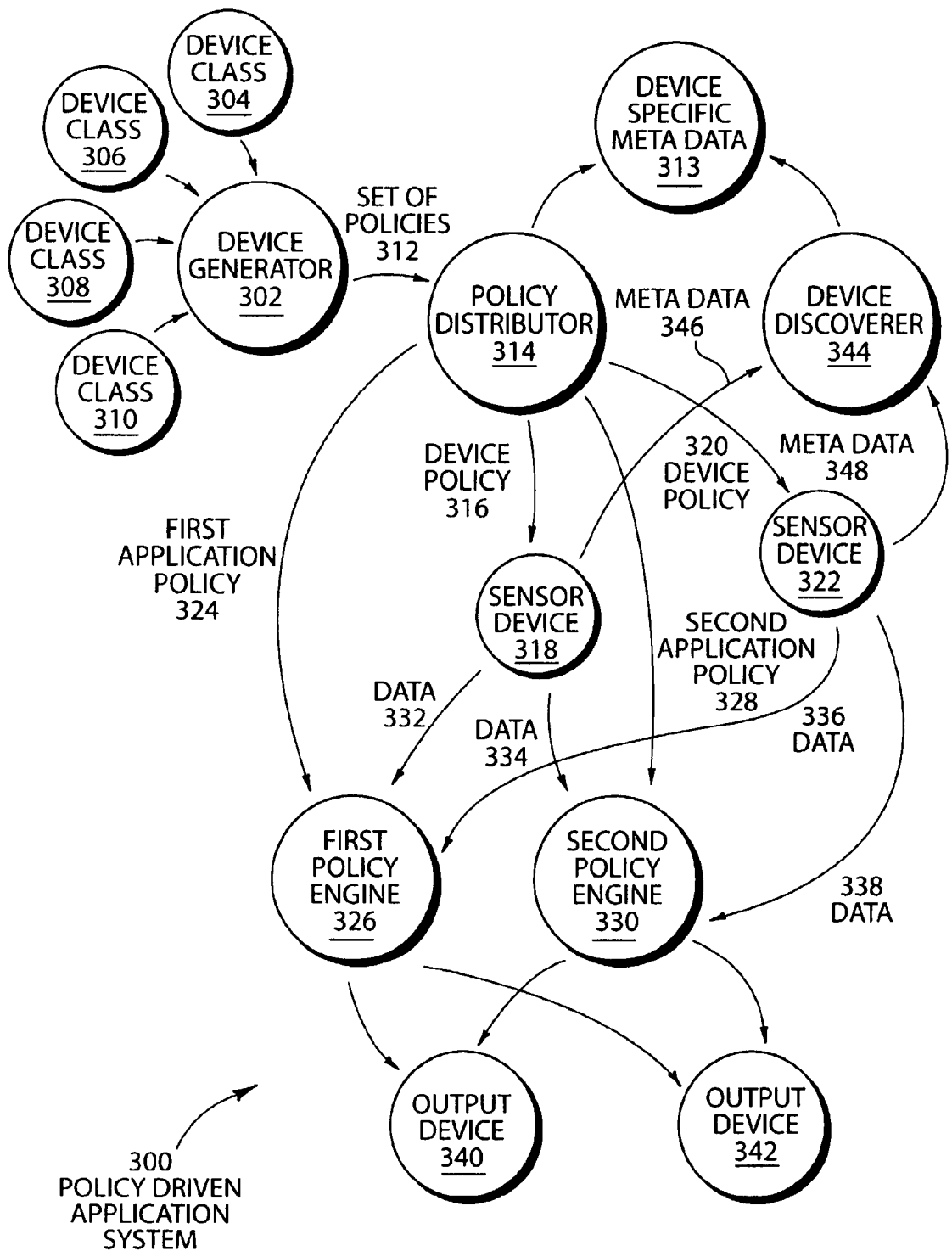
FIG. 3 is an illustration of an embodiment showing a policy-driven application system.

FIG. 3 is a diagram illustrating an embodiment 300 showing a policy driven application system. A policy generator 302 generates polices using various classes of devices 304, 306, and 308, coupled with some logic or rules 310 to generate a set of policies 312. The set of policies 312 may be generic in that any sensor device within a particular class may be used as an input device.

The policy distributor 314 uses device-specific metadata 313 to generate specific policies for particular devices. The policy distributor 314 may send a device policy 316 to sensor device 318, another device policy 320 to sensor device 322, a first application policy 324 to a first policy engine 326, and a second application policy 328 to a second policy engine 330. Device-specific metadata 313 may include environmentally-derived information such as global positioning system location data, temperature data, humidity data, or other information. In some instances, device-specific metadata 313 may also include the results of data processing by the device, such as voice recognition data analyzed by an audio capture device, or the output of a video image processing system. In some instances, a sensor device 318 or 322 may push metadata and data to one of the policy engines 326 or 330 when data or metadata change or pass beyond a predefined limit. In other instances, a policy engine 326 or 330 may periodically query the sensor device 318 or 322 to pull data or metadata.

The device-specific metadata 313 comes from a device discoverer 344 that may receive metadata 346 from sensor device 318 and metadata 348 from sensor device 322. In other embodiments, the device discoverer 344 may determine a serial number, model number, or other identifier from a device and query a database that may contain metadata for the device.

When the policies are operational in the various devices and policy engines, sensor device 318 may send data 332 to the first policy server 326 and data 334 to the second policy server 330. Similarly, the sensor device 322 may send data 336 to the first policy server 326 and data 338 to the second policy server 330. The data 332 and 334 sent from sensor device 318 may be the same data or different data, depending on the device policy 316. In some instances, the device policy 316 may have a first condition that causes a first set of data 332 to be sent to the first policy server 326 while a second condition causes a second set of data 334 to be sent to the second policy engine 330.

The first policy engine 326 may send data to output devices 340 and 342. Similarly, the second policy engine 330 may also send data to output devices 340 and 342. In some embodiments, one policy engine may send data to one output device or group of output devices while a second policy engine sends data to a different device or group of output devices.

Figure 4:
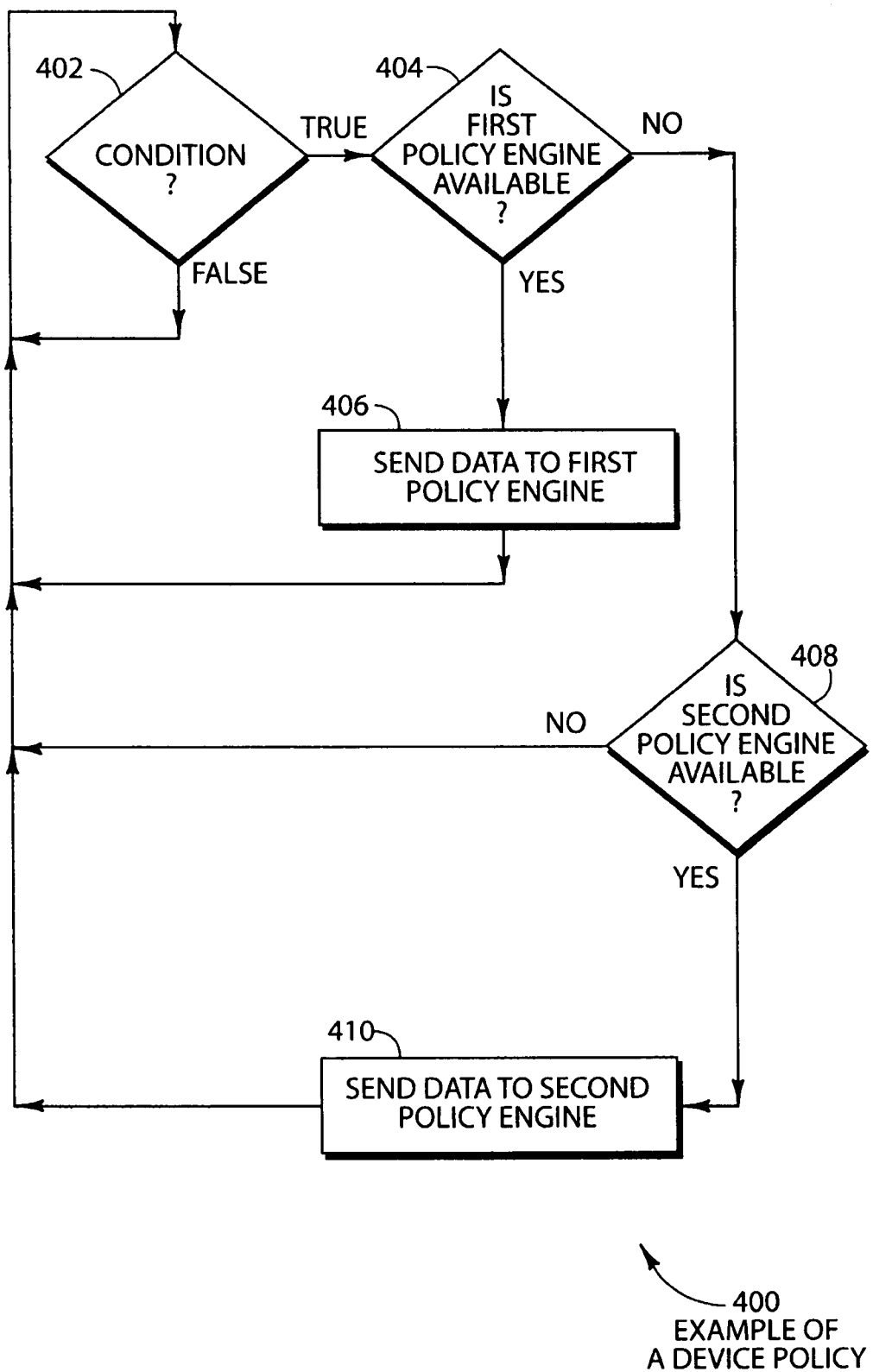
FIG. 4 is a flowchart illustration of an embodiment of an example of a sensor device policy.

FIG. 4 is a flowchart illustration of an embodiment 400 showing a device policy. When a condition is true in block 402 and a first policy engine is available in block 404, data may be sent to the first policy engine in block 406. The process returns to block 402.

If the first policy engine is not available in block 404 and a second policy engine is available in block 408, data is sent to the second policy engine in block 410 and the process returns to block 402. Otherwise, the process returns to block 402.

Embodiment 400 is but one example of a device policy that uses the unavailability of a first policy engine to determine that data is to be sent to a second policy engine. In some instances, the second policy engine may be a backup policy engine, where the same data is transferred to the second policy engine as would have been transferred to the first. In other instances, the second policy engine may have a different set of policies than the first policy engine and perform different functions with different output devices.

In other embodiments, two or more policy engines may act in parallel on the same data received from a sensor device. In one such embodiment, each of the policy engines may perform the same logic and essentially serve as a backup policy engine to the other. In another such an embodiment, one policy engine may perform a first function and the other policy engine may perform a second function. The two functions may be exclusive of each other or may cooperate to perform a larger overall function.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on a sensor device that includes a processor, a sensor, metadata, and a network interface, the method comprising:
    defining, via a set of policies, various actions that the sensor device is configured to perform based at least on conditions of the sensor, where the various actions include the sensor device communicating via the network interface with a local policy engine and a remote policy engine, where the set of policies was generated based on at least device-specific metadata;
    including, in the metadata, a classification that defines a type of the sensor device and that describes a protocol sufficient for communicating with the sensor device via the network interface;
    sending, via the network interface and in accordance with at least one policy of the set of policies and in response to the sensor detecting a particular condition and to detecting the local policy engine, a message to the local policy engine, the message including at least sensory output from the sensor; and
    sending, via the network interface and in accordance with the at least one policy and in response to the sensor detecting the particular condition and to not detecting the local policy engine, the message to the remote policy engine.

2. The method of claim 1, the sensor device comprising a display configured for being controlled by the sensor device, the local policy engine, or the remote policy engine.

3. The method of claim 1, the sensor device configured for coupling to a plurality of remote sensors.

4. The method of claim 1 where the metadata identifies several classifications of the sensor device.

5. The method of claim 1, the sensor device configured for executing at least one policy of the set of policies.

6. The method of claim 1 where the metadata comprises other metadata sufficient for use in storing, modifying, and retrieving policy data from the set of policies.

7. A sensor device that includes a processor, a sensor, metadata, and a network interface, the sensor device configured for performing actions comprising:
    defining, via a set of policies, various actions that the sensor device is configured to perform based at least on conditions of the sensor, where the various actions include the sensor device communicating via the network interface with a local policy engine and a remote policy engine, where the set of policies was generated based on at least device-specific metadata;
    including, in the metadata, a classification that defines a type of the sensor device and that describes a protocol sufficient for communicating with the sensor device via the network interface;
    sending, via the network interface and in accordance with at least one policy of the set of policies and in response to the sensor detecting a particular condition and to detecting the local policy engine, a message to the local policy engine, the message including at least sensory output from the sensor; and
    sending, via the network interface and in accordance with the at least one policy and in response to the sensor detecting the particular condition and to not detecting the local policy engine, the message to the remote policy engine.

8. The sensor device of claim 7 further comprising a display configured for being controlled by the logic processor, the local policy engine, or the remote policy engine.

9. The sensor device of claim 7 configured for coupling to a plurality of remote sensors.

10. The sensor device of claim 7 where the metadata identifies several classifications of the sensor device.

11. The sensor device of claim 7 configured for executing at least one policy of the set of policies.

12. The sensor device of claim 7 where the metadata comprises other metadata sufficient for use in storing, modifying, and retrieving policy data from the set of policies.

13. At least one computer storage device storing computer-executable instructions that, when executed by a sensor device that includes a processor, a sensor, metadata, and a network interface, cause the sensor device to perform actions comprising:
    defining, via a set of policies, various actions that the sensor device is configured to perform based at least on conditions of the sensor, where the various actions include the sensor device communicating via the network interface with a local policy engine and a remote policy engine, where the set of policies was generated based on at least device-specific metadata;
    including, in the metadata, a classification that defines a type of the sensor device and that describes a protocol sufficient for communicating with the sensor device via the network interface;
    sending, via the network interface and in accordance with at least one policy of the set of policies and in response to the sensor detecting a particular condition and to detecting the local policy engine, a message to the local policy engine, the message including at least sensory output from the sensor; and
    sending, via the network interface and in accordance with the at least one policy and in response to the sensor detecting the particular condition and to not detecting the local policy engine, the message to the remote policy engine.

14. The at least one computer storage device of claim 13, the sensor device comprising a display configured for being controlled by the sensor device, the local policy engine, or the remote policy engine.

15. The at least one computer storage device of claim 13, the sensor device configured for coupling to a plurality of remote sensors.

16. The at least one computer storage device of claim 13 where the metadata identifies several classifications of the sensor device, or where the metadata comprises other metadata sufficient for use in storing, modifying, and retrieving policy data from the set of policies.

17. The at least one computer storage device of claim 13, the sensor device configured for executing at least one policy of the set of policies.

* * * * *